(12) United States Patent
Choi et al.

(10) Patent No.: US 10,240,002 B2
(45) Date of Patent: Mar. 26, 2019

(54) POLY(IMIDE-AMIDE) COPOLYMER, A METHOD FOR PREPARING A POLY(IMIDE-AMIDE) COPOLYMER, AND AN ARTICLE INCLUDING A POLY(IMIDE-AMIDE) COPOLYMER

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Hongkyoon Choi, Seoul (KR); Chanjae Ahn, Suwon-si (KR); Hyunjeong Jeon, Seoul (KR); Sang Soo Jee, Hwaseong-si (KR); Sungwon Choi, Hwaseong-si (KR); Sung Woo Hong, Seoul (KR); Byunghee Sohn, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 36 days.

(21) Appl. No.: 15/346,876

(22) Filed: Nov. 9, 2016

(65) Prior Publication Data
US 2017/0130004 A1 May 11, 2017

(30) Foreign Application Priority Data
Nov. 9, 2015 (KR) .................. 10-2015-0156846

(51) Int. Cl.
C08G 73/14 (2006.01)
B32B 27/00 (2006.01)
C09D 179/08 (2006.01)
C09J 179/08 (2006.01)
C08G 73/10 (2006.01)

(52) U.S. Cl.
CPC ......... *C08G 73/14* (2013.01); *C08G 73/1039* (2013.01); *C08G 73/1042* (2013.01); *C08G 73/1067* (2013.01); *C09D 179/08* (2013.01); *C09J 179/08* (2013.01)

(58) Field of Classification Search
USPC ............ 528/289, 359; 428/1.25, 1.26, 473.5, 428/474.4
See application file for complete search history.

(56) References Cited

U.S. PATENT DOCUMENTS 9,018,343 B2 4/2015 Park et al.
9,051,425 B2 6/2015 Cho et al.
9,365,694 B2 6/2016 Cho et al.
9,796,816 B2 * 10/2017 Cho .................. C08G 73/14
9,988,493 B2 * 6/2018 Ahn .................. C08G 73/14
2012/0296050 A1 * 11/2012 Cho .................. C08G 73/14 525/436
2014/0031499 A1 * 1/2014 Cho .................. C08G 73/1067 525/431

FOREIGN PATENT DOCUMENTS

JP 2013-155329 A 8/2013
KR 2013-0091217 A 8/2013
KR 2014-0016199 A 2/2014
KR 1459178 B1 10/2014

* cited by examiner

Primary Examiner — Tae H Yoon
(74) Attorney, Agent, or Firm — Cantor Colburn LLP

(57) ABSTRACT

A poly(imide-amide) copolymer including a structural unit represented by Chemical Formula 1; a structural unit represented by Chemical Formula 2; and any one of a structural unit represented by Chemical Formula 3, an amic acid precursor of the structural unit represented by Chemical Formula 3, and a combination thereof; wherein a cured material of the poly(imide-amide) copolymer may have a tensile modulus of greater than or equal to about 5.5 GPa, and a yellowness index of less than or equal to about 5:

Chemical Formula 1

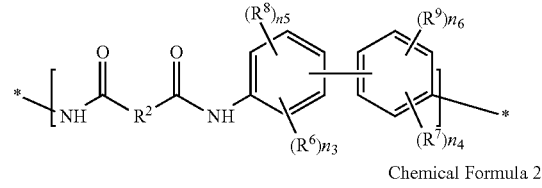

Chemical Formula 2

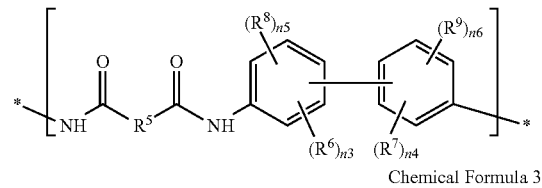

Chemical Formula 3

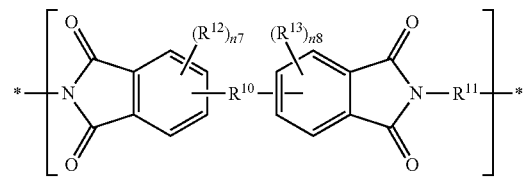

wherein, groups and variables in Chemical Formulae 1 and 3 are the same as described in the specification.

10 Claims, No Drawings

POLY(IMIDE-AMIDE) COPOLYMER, A METHOD FOR PREPARING A POLY(IMIDE-AMIDE) COPOLYMER, AND AN ARTICLE INCLUDING A POLY(IMIDE-AMIDE) COPOLYMER

CROSS-REFERENCE TO RELATED APPLICATION

This application claims priority to Korean Patent Application No. 10-2015-0156846, filed on Nov. 9, 2015, and all the benefits accruing therefrom under 35 U.S.C. § 119, the content of which is incorporated herein in its entirety by reference.

BACKGROUND

1. Field

This disclosure relates to a poly(imide-amide) copolymer, a method for preparing a poly(imide-amide) copolymer, and to an article including a poly(imide-amide) copolymer.

2. Description of the Related Art

A flexible display, which is not restricted by time and place, that is thin and flexible like paper, ultra light, and consumes a small amount of electricity, has been increasingly in demand as a display for visualizing various information and delivering it to the users. The flexible display may be realized by using a flexible substrate, organic and inorganic materials for a low temperature process, flexible electronics, encapsulation, packaging, and the like.

A transparent plastic film for replacing a conventional window cover glass to be used in a flexible display must meet high hardness and optical properties. Hardness may be supplemented by a hard coating layer, but in this case also, a base film having a high tensile modulus renders a final film having a high hardness. Desired optical properties include high light transmittance, low haze, low yellowness index, and the like.

Thus, there remains a need for polymers having excellent optical and mechanical properties.

SUMMARY

An embodiment provides a poly(imide-amide) copolymer having improved optical and mechanical properties.

Another embodiment provides a composition for preparing a poly(imide-amide) copolymer.

Still another embodiment provides a method for preparing a poly(imide-amide) copolymer.

Yet another embodiment provides an article including a poly(imide-amide) copolymer.

According to an embodiment, provided is a poly(imide-amide) copolymer including:
a structural unit represented by Chemical Formula 1;
a structural unit represented by Chemical Formula 2; and
any one of a structural unit represented by Chemical Formula 3, an amic acid precursor of the structural unit represented by Chemical Formula 3, and a combination thereof;
wherein a cured material of the poly(imide-amide) copolymer has a tensile modulus of greater than or equal to about 5.5 gigapascals, and a yellowness index of less than or equal to about 5:

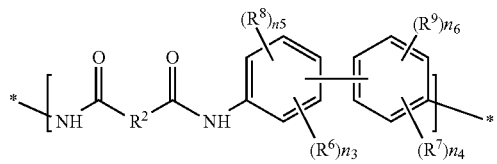

Chemical Formula 1 wherein, in Chemical Formula 1,
$R^2$ is a substituted or unsubstituted phenylene group,
$R^6$ and $R^7$ are the same or different and are each independently an electron withdrawing group;
$R^8$ and $R^9$ are the same or different and are each independently a halogen, a hydroxy group, a substituted or unsubstituted C1 to C10 aliphatic organic group, a C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$ wherein $R^{206}$, $R^{206}$, and $R^{207}$ are the same or different, and are each independently hydrogen or a C1 to C10 aliphatic organic group,
n3 is an integer ranging from 1 to 4, n5 is an integer ranging from 0 to 3, provided that n3+n5 is an integer ranging from 1 to 4, and
n4 is an integer ranging from 1 to 4, n6 is an integer ranging from 0 to 3, provided that n4+n6 is an integer ranging from 1 to 4.

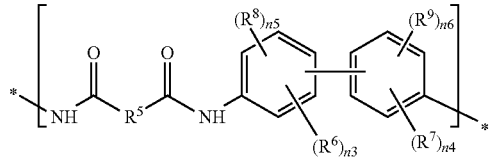

Chemical Formula 2

In Chemical Formula 2,
$R^5$ is a substituted or unsubstituted biphenylene group,
$R^6$ to $R^9$, and n3 and n4 are the same as defined in Chemical Formula 1.

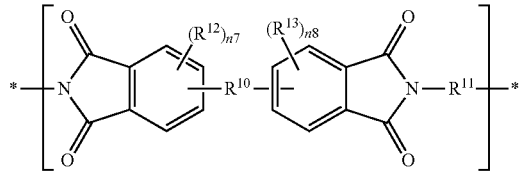

Chemical Formula 3

In Chemical Formula 3,
$R^{10}$ is single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group,
$R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —$OR^{208}$, wherein $R^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are each independently hydrogen or a C1 to C10 aliphatic organic group, n7 and n8 are each independently an integer ranging from 0 to 3, and R$^{11}$ is represented by Chemical Formula 4:

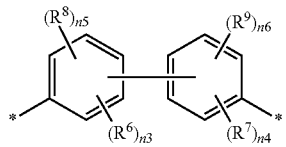

Chemical Formula 4

In Chemical Formula 4,

R$^6$ to R$^9$, and n3 and n4 are the same as defined in Chemical Formula 1.

In the poly(imide-amide) copolymer according to an embodiment, a mole ratio of the sum of the structural unit represented by Chemical Formula 1 and the structural unit represented by Chemical Formula 2, and the structural unit represented by Chemical Formula 3 is about 20:80 to about 80:20.

In the poly(imide-amide) copolymer according to an embodiment, a content of the structural unit represented by Chemical Formula 1 is less than about 20 mole percent based on the total mole number of the structural unit represented by Chemical Formula 1, the structural unit represented by Chemical Formula 2, and the structural unit represented by Chemical Formula 3.

The structural unit represented by Chemical Formula 3 may be at least one of a structural unit represented by Chemical Formula 5 and a structural unit represented by Chemical Formula 6:

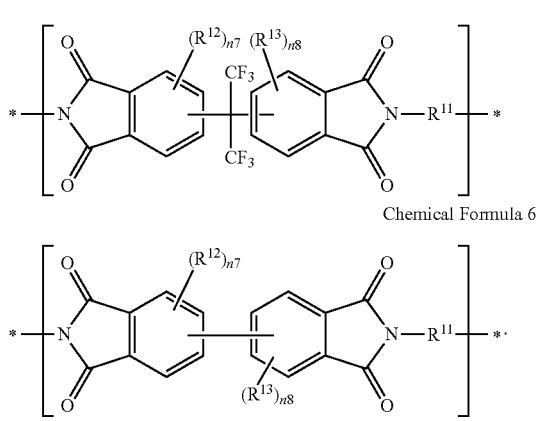

Chemical Formula 5

Chemical Formula 6

In Chemical Formulae 5 and 6,

R$^{11}$ to R$^{13}$ and n7 and n8 are the same as defined in Chemical Formula 3.

A mole ratio of the structural unit represented by Chemical Formula 5 and the structural unit represented by Chemical Formula 6 may be about 1:99 to about 99:1 in the poly(imide-amide) copolymer according to an embodiment.

The electron withdrawing group may be selected from —CF$_3$, —CCl$_3$, —CBr$_3$, —CI$_3$, —NO$_2$, —CN, —C(═O)CH$_3$, and —CO$_2$C$_2$H$_5$.

The structural unit represented by Chemical Formula 1 may be represented by a structural unit represented by Chemical Formula 7, a structural unit represented by Chemical Formula 8, or a combination thereof:

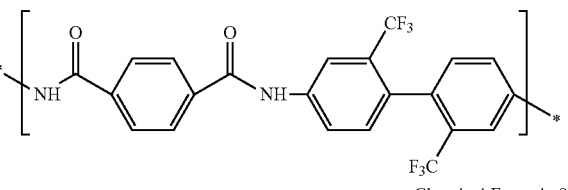

Chemical Formula 7

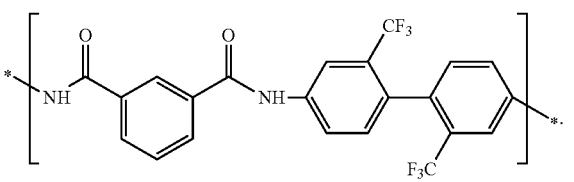

Chemical Formula 8

The structural unit represented by Chemical Formula 2 may be represented by a structural unit represented by Chemical Formula 9:

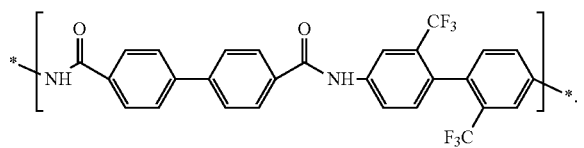

Chemical Formula 9

The structural unit represented by Chemical Formula 3 may be represented by at least one of a structural unit represented by Chemical Formula 10 and a structural unit represented by Chemical Formula 11:

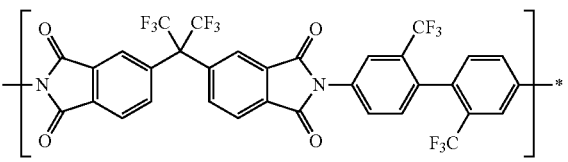

Chemical Formula 10

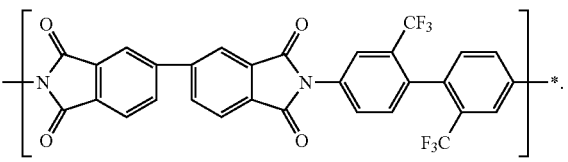

Chemical Formula 11

The poly(imide-amide) copolymer may include the structural unit represented by Chemical Formula 7, the structural unit represented by Chemical Formula 9, the structural unit represented by Chemical Formula 10, and the structural unit represented by Chemical Formula 11.

According to another embodiment, provided is a composition for preparing a poly(imide-amide) copolymer including an oligomer represented by Chemical Formula 12, and a compound represented by Chemical Formula 14:

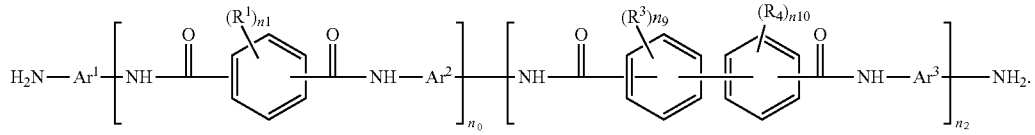

Chemical Formula 12

In Chemical Formula 12, $R^1$, $R^3$ and $R^4$ are the same or different and are each independently a halogen, a hydroxyl group, a substituted or unsubstituted C1 to C10 alkyl group, a substituted or unsubstituted C6 to C20 aryl group, or a substituted or unsubstituted C1 to C10 alkoxy group, n0 and n2 are the same or different and are each independently an integer of greater than or equal to 0, n1, n9, and n10 are the same or different and are each independently an integer ranging from 0 to 4, and $Ar^1$, $Ar^2$ and $Ar^3$ are the same or different and are each independently represented by Chemical Formula 4:

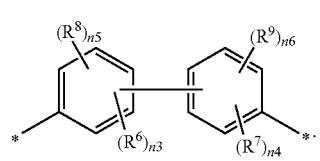

Chemical Formula 4

In Chemical Formula 4, $R^6$ and $R^7$ are the same or different and are each independently an electron withdrawing group, $R^8$ and $R^9$ are the same or different and are each independently a halogen, a hydroxyl group, a substituted or unsubstituted C1 to C10 aliphatic group, a substituted or unsubstituted C6 to C20 aromatic group, an alkoxy group of formula $—OR^{204}$, wherein $R^{204}$ is a C1 to C10 aliphatic organic group, or a silyl group of formula $—SiR^{205}R^{206}R^{207}$, wherein $R^{205}$, $R^{206}$, and $R^{207}$ are the same or different and are each independently a hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4.

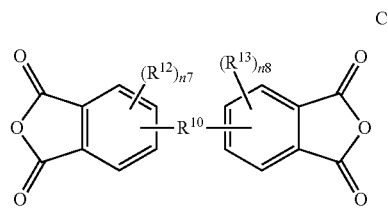

Chemical Formula 14

In Chemical Formula 14, $R^{10}$ is single bond, a substituted or unsubstituted C1 to C30 aliphatic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are each independently a halogen, a hydroxyl group, a substituted or unsubstituted C1 to C10 aliphatic group, a substituted or unsubstituted C6 to C20 aromatic group, an alkoxy group of formula $—OR^{205}$, wherein $R^{205}$ is a C1 to C10 aliphatic organic group, or a silyl group of formula $—SiR^{209}R^{210}R^{211}$, wherein $R^{209}$, $R^{210}$, and $R^{211}$ are the same or different and are each independently a hydrogen or a C1 to C10 aliphatic organic group, and n7 and n8 are the same or different and are each independently an integer ranging from 0 to 3.

The compound represented by Chemical Formula 14 may include a compound represented by Chemical Formula 15, a compound represented by Chemical Formula 16, or a combination thereof:

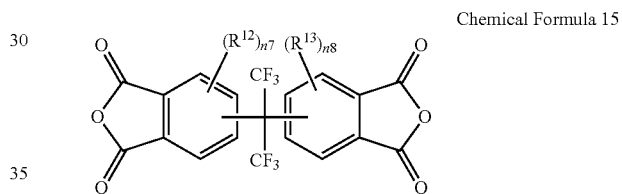

Chemical Formula 15

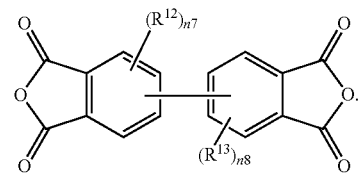

Chemical Formula 16

In Chemical Formulae 15 and 16, $R^{12}$, $R^{13}$, n7, and n8 are the same as defined in Chemical Formula 14.

The electron withdrawing group may be selected from $—CF_3$, $—CCl_3$, $—CBr_3$, $—Cl_3$, $—NO_2$, $—CN$, $—C(=O)CH_3$, and $—CO_2C_2H_5$.

The composition for preparing a poly(imide-amide) copolymer according to an embodiment may include the oligomer represented by Chemical Formula 12 and the compound represented by Chemical Formula 14 in a mole ratio of about 1:1.

A content of the structural unit represented by 'n0' in the oligomer represented by Chemical Formula 12 is less than about 20 mole percent based on the total mole number of the structural unit represented by 'n0', the structural unit represented by 'n2', and the compound represented by Chemical Formula 14.

According to another embodiment, provided is a method for preparing a poly(imide-amide) copolymer including reacting an oligomer represented by Chemical Formula 12, and a compound represented by Chemical Formula 14:

Chemical Formula 12

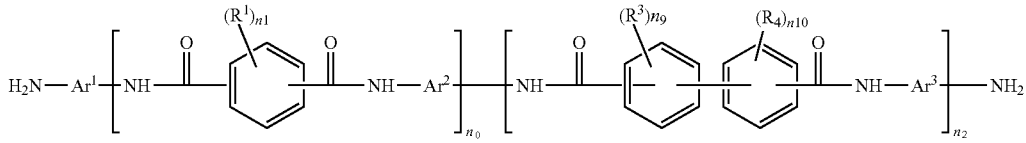

wherein, in Chemical Formula 12, $R^1$, $R^3$ and $R^4$ are the same or different, and are each independently selected from a halogen, a hydroxyl group, a substituted or unsubstituted C1 to C10 alkyl group, a substituted or unsubstituted C6 to C20 aryl group, or a substituted or unsubstituted C1 to C10 alkoxy group, n0 and n2 are the same or different, and are each independently an integer of greater than or equal to 0, n1, n9, and n10 are the same or different, and are each independently an integer ranging from 0 to 4, and $Ar^1$, $Ar^2$ and $Ar^3$ are the same or different and are each independently represented by Chemical Formula 4:

Chemical Formula 4

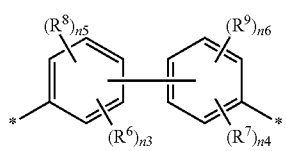

wherein, in Chemical Formula 4, $R^6$ and $R^7$ are the same or different and are each independently an electron withdrawing group, $R^8$ and $R^9$ are the same or different and are each independently a halogen, a hydroxyl group, a substituted or unsubstituted C1 to C10 aliphatic group, a substituted or unsubstituted C6 to C20 aromatic group, an alkoxy group of formula $—OR^{204}$, wherein $R^{204}$ is a C1 to C10 aliphatic organic group, or a silyl group of formula $—SiR^{205}R^{206}R^{207}$, wherein $R^{205}$, $R^{206}$, and $R^{207}$ are the same or different and are each independently a hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4.

Chemical Formula 14

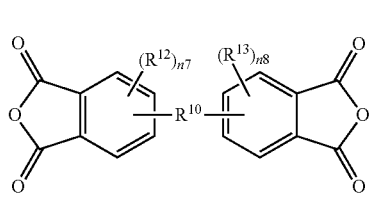

In Chemical Formula 14, $R^{10}$ is single bond, a substituted or unsubstituted C1 to C30 aliphatic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are each independently a halogen, a hydroxyl group, a substituted or unsubstituted C1 to C10 aliphatic group, a substituted or unsubstituted C6 to C20 aromatic group, an alkoxy group of formula $—OR^{205}$, wherein $R^{205}$ is a C1 to C10 aliphatic organic group, or a silyl group of formula $—SiR^{209}R^{210}R^{211}$, wherein $R^{209}$, $R^{210}$, and $R^{211}$ are the same or different and are each independently a hydrogen or a C1 to C10 aliphatic organic group, and n7 and n8 are the same or different and are each independently an integer ranging from 0 to 3.

The compound represented by Chemical Formula 14 may include a compound represented by Chemical Formula 15, a compound represented by Chemical Formula 16, or a combination thereof:

Chemical Formula 15

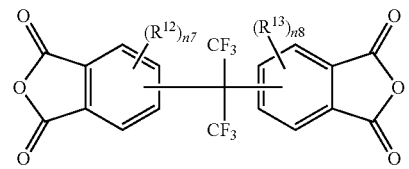

Chemical Formula 16

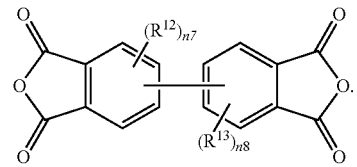

In Chemical Formulae 15 and 16, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula $—OR^{208}$, wherein $R^{208}$ is a C1 to C10 aliphatic organic group, or a silyl group of formula $—SiR^{209}R^{210}R^{211}$, wherein $R^{209}$, $R^{210}$, and $R^{211}$ are the same or different, and are each independently hydrogen or a C1 to C10 aliphatic organic group, and n7 and n8 are each independently an integer ranging from 0 to 3.

According to yet another embodiment, provided is an article including the poly(imide-amide) copolymer according to an embodiment or the poly(imide-amide) copolymer prepared by the method according to an embodiment.

The article may be a film, a fiber, a coating material, or an adhesive.

The article may be a film, and may have a yellowness index of equal to or less than about 5, measured for a film having a thickness of about 50 micrometers, according to an ASTM D 1925 method.

The article may be a film, and may have a tensile modulus of greater than or equal to about 5.5 gigapascals, measured for a film having a thickness of about 50 micrometers, according to an ASTM D882 method.

According to still another embodiment, provided is a display device including the article.

The display device may be a flexible display device.

Hereinafter, further embodiments will be described in detail.

DETAILED DESCRIPTION

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxyl group, a nitro group, a cyano group, an amino group (—NH$_2$, —NH(R$^{100}$) or —N(R$^{101}$)(R$^{102}$), wherein R$^{100}$, R$^{101}$ and R$^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon having the specified number of carbon atoms and having a valence of at least one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, propoxy, cyclopropoxy, and cyclohexyloxy.

As used herein, the term "aryl group", which is used alone or in combination, refers to an aromatic hydrocarbon containing at least one ring. Non-limiting examples of the aryl group are phenyl, naphthyl, and tetrahydronaphthyl.

As used herein, when a specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refer to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, the term "alkenyl group" refers to a C2 to C30 alkenyl group, and specifically a C2 to C18 alkenyl group, the term "alkynyl group" refers to a C2 to C30 alkynyl group, and specifically a C2 to C18 alkynyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, and specifically through —S(=O)$_2$—, for example an aryl group or a C6 to C30 arylene group, specifically a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "combination" commonly refers to mixing or copolymerization.

As used herein, when a definition is not otherwise provided, "polyimide" may refer to not only "polyimide", but also "polyamic acid" or a combination of "polyimide" and "polyamic acid". Further, the terms "polyimide" and "polyamic acid" may be understood as the same material.

In addition, in the specification, the mark "*" may refer to a point of attachment to another atom.

Research efforts towards converting mobile devices, such as, a mobile phone or a tablet personal computer, and the like, to light, flexible, and bendable devices is currently ongoing. In this regard, a flexible and transparent window film for a display device having a high hardness for replacing a rigid glass placed on top of the mobile devices is desired.

To be used as a window film, a high hardness and good optical properties are desired. Hardness may be supplemented with a hard coating layer, but a base film having a high tensile modulus may help a final film have a high hardness. Desired optical properties include high light transmittance, low haze, low yellowness index, and the like.

A polyimide or poly(imide-aramide) copolymer has excellent mechanical, thermal, and optical properties, and thus is widely used as a plastic substrate for a display device, such as an organic light emitting device (OLED), liquid crystal device (LCD), and the like. In order to use polyimide or poly(imide-amide) film as a window film for a flexible display device, however, further improved mechanical and optical properties, such as, high hardness (or modulus), high transmittance, low yellowness index, and the like, are desired. It is difficult, however, to improve both the mechanical and optical properties at the same time, as the modulus and yellowness index of a polyimide or poly(imide-amide) film have a trade-off relationship with regard to each other.

The inventors of the present application have found a new combination of an amide structural unit and an imide structural unit for preparing a poly(imide-amide) copolymer, which is capable of exhibiting good optical properties, as well as improved mechanical properties, and further found that it is possible to prepare a poly(imide-amide) copolymer having further improved optical properties and mechanical properties by including the amide structural unit and the imide structural unit in a specific amount.

Accordingly, the poly(imide-amide) copolymer according to an embodiment includes a structural unit represented by Chemical Formula 1; a structural unit represented by Chemical Formula 2; and any one of a structural unit represented by Chemical Formula 3, an amic acid precursor of the structural unit represented by Chemical Formula 3, and a combination thererof; and a cured material of the poly(imide-amide) copolymer may have a tensile modulus of greater than or equal to about 5.5 gigapascals (GPa), and a yellowness index of less than or equal to about 5:

Chemical Formula 1

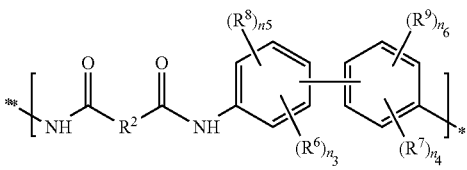

wherein, in Chemical Formula 1,
$R^2$ is a substituted or unsubstituted phenylene group,
$R^6$ and $R^7$ are the same or different and are each independently an electron withdrawing group;

$R^8$ and $R^9$ are the same or different, and are each independently a halogen, a hydroxy group, a substituted or unsubstituted C1 to C10 aliphatic organic group, a C6 to C20 aromatic organic group, an alkoxy group of formula $-OR^{204}$, wherein $R^{204}$ is a C1 to C10 aliphatic organic group, or a silyl group of formula $-SiR^{205}R^{206}R^{207}$ wherein $R^{205}$, $R^{206}$, and $R^{207}$ are the same or different, and are each independently hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer from 1 to 4, n6 is an integer from 0 to 3, provided that n4+n6 is an integer ranging from 1 to 4;

Chemical Formula 2

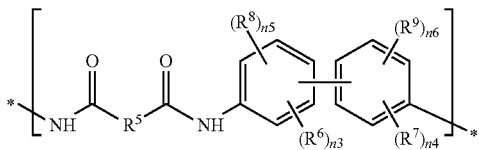

wherein, in Chemical Formula 2, $R^5$ is a substituted or unsubstituted biphenylene group, $R^6$ to $R^9$, n3, and n4 are the same as defined in Chemical Formula 1.

Chemical Formula 3

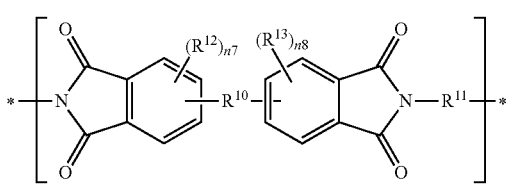

wherein, in Chemical Formula 3, $R^{10}$ is single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula $-OR^{208}$, wherein $R^{208}$ is a C1 to C10 aliphatic organic group, or a silyl group of formula $-SiR^{209}R^{210}R^{211}$, wherein $R^{209}$, $R^{210}$, and $R^{211}$ are the same or different, and are each independently hydrogen or a C1 to C10 aliphatic organic group, n7 and n8 are each independently an integer ranging from 0 to 3, and $R^{11}$ is represented by Chemical Formula 4:

Chemical Formula 4

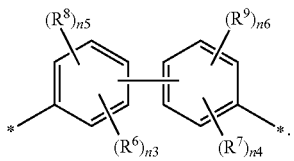

Wherein, in Chemical Formula 4, $R^6$ to $R^9$, and n3 and n4 are the same as defined in Chemical Formula 1.

It should be understood that not each and every cured material of the poly(imide-amide) copolymer disclosed herein may necessarily exhibit a tensile modulus of greater than or equal to about 5.5 GPa, and a yellowness index of less than or equal to about 5. Rather, the above property limitations should be used in conjunction with the structural features of the poly(imide-amide) copolymer to determine the meets and bounds of the instantly claimed subject matter.

In the poly(imide-amide) copolymer according to an embodiment, a mole ratio of the sum of the structural unit represented by Chemical Formula 1 and the structural unit represented by Chemical Formula 2, and the structural unit represented by Chemical Formula 3 may be from about 20:80 to about 80:20.

In an exemplary embodiment, a mole ratio of the sum of the structural unit represented by Chemical Formula 1 and the structural unit represented by Chemical Formula 2, and the structural unit represented by Chemical Formula 3 may be from about 40:60 to about 80:20, for example, from about 50:50 to about 60:40, in the poly(imide-amide) copolymer.

The structural unit represented by Chemical Formula 1 and the structural unit represented by Chemical Formula 2 are amide structural units, and the poly(imide-amide) copolymer including the amide structural units in the above range may exhibit unique properties of the amide structural units and the imide structural unit, as well as define homogeneous properties of the copolymer.

For example, a content of the structural unit represented by Chemical Formula 1 may be included in an amount of less than 20 mole percent (mole %) based on the total mole number of the structural unit represented by Chemical Formula 1, the structural unit represented by Chemical Formula 2, and the structural unit represented by Chemical Formula 3.

For example, a content of the structural unit represented by Chemical Formula 1 may be included in an amount of, for example, from about 5 mole % to about 19 mole %, for example, from about 10 mole % to about 19 mole %, for example, from about 15 mole % to about 19 mole %, based on the total mole number of the structural unit represented by Chemical Formula 1, the structural unit represented by Chemical Formula 2, and the structural unit represented by Chemical Formula 3.

The poly(imide-amide) copolymer including the structural unit represented by Chemical Formula 1, the structural unit represented by Chemical Formula 2, and the structural unit represented by Chemical Formula 3 are in the above range may exhibit good optical properties, as well as having further improved mechanical properties, for example, a further improved tensile modulus.

As described later in the Examples, when fabricating a film from the poly(imide-amide) copolymer according to an embodiment may have a yellowness index of less than or equal to about 5, for example, less than 5, for example, less than or equal to about 4.5, for example, less than or equal to about 4.0, as well as having a high mechanical strength, for example, a tensile modulus of about greater than or equal to about 5.5 GPa, for example, greater than or equal to about 5.6 GPa, for example, greater than or equal to about 5.7 GPa, for example, greater than or equal to about 5.8 GPa, for example, greater than or equal to about 5.9 GPa. These effects are very advantageous when considering the trade-off relationship between optical and mechanical properties of a poly(imide-amide) copolymer.

Meanwhile, the structural unit represented by Chemical Formula 3 may be at least one of a structural unit represented by Chemical Formula 5 and a structural unit represented by Chemical Formula 6:

Chemical Formula 5

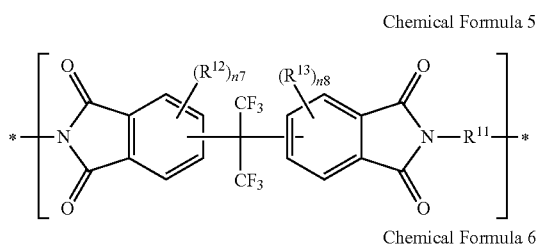

Chemical Formula 6

In Chemical Formulae 5 and 6,
$R^{11}$ to $R^{13}$, n7 and n8 are the same as defined in Chemical Formula 3.

The structural unit represented by Chemical Formula 5 and the structural unit represented by Chemical Formula 6 may be included in a mole ratio of about 1:99 to about 99:1 in the poly(imide-amide) copolymer according to an embodiment. For example, the structural unit represented by Chemical Formula 5 and the structural unit represented by Chemical Formula 6 may be included in a mole ratio of about 5:95 to about 95:5 in the poly(imide-amide) copolymer according to an embodiment.

By including the structural unit represented by Chemical Formula 5 and the structural unit represented by Chemical Formula 6 in the above mole ratio, the poly(imide-amide) copolymer prepared therefrom may have an improved surface hardness, high light transmittance, and a low yellowness index, when prepared to a film.

The electron withdrawing group may be selected from —$CF_3$, —$CCl_3$, —$CBr_3$, —$Cl_3$, —$NO_2$, —CN, —C(=O)$CH_3$, and —$CO_2C_2H_5$. In an exemplary embodiment, the electron withdrawing group may be —$CF_3$.

The structural unit represented by Chemical Formula 1 may be a structural unit represented by Chemical Formula 7, a structural unit represented by Chemical Formula 8, or a combination thereof:

Chemical Formula 7

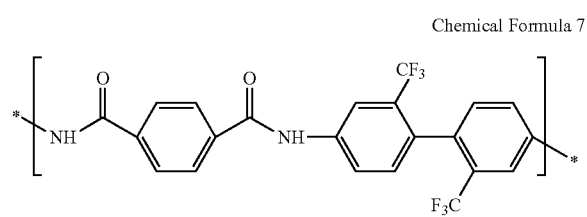

Chemical Formula 8

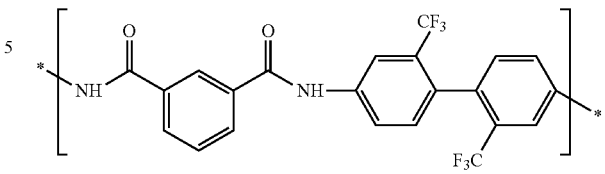

The structural unit represented by Chemical Formula 2 may be a structural unit represented by Chemical Formula 9:

Chemical Formula 9

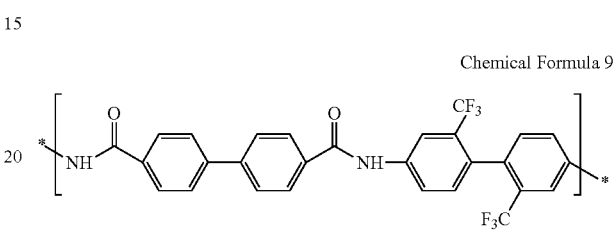

The structural unit represented by Chemical Formula 3 may be a combination of the structural unit represented by Chemical Formula 10 and the structural unit represented by Chemical Formula 11:

Chemical Formula 10

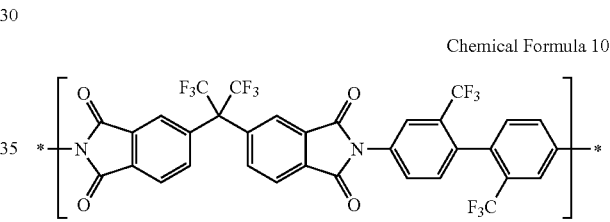

Chemical Formula 11

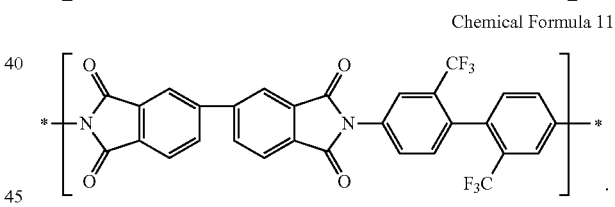

In an exemplary embodiment, the poly(imide-amide) copolymer may include the structural unit represented by Chemical Formula 7, the structural unit represented by Chemical Formula 9, the structural unit represented by Chemical Formula 10, and the structural unit represented by Chemical Formula 11.

According to another embodiment, provided is a composition for preparing a poly(imide-amide) copolymer including an oligomer represented by Chemical Formula 12, and a compound represented by Chemical Formula 14:

Chemical Formula 12

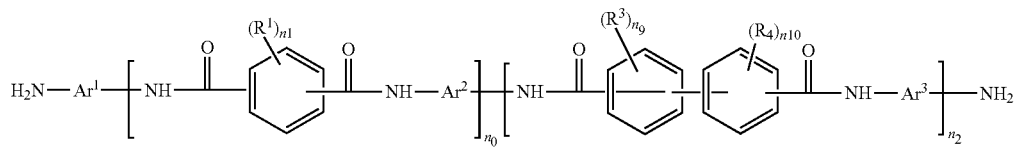

wherein, in Chemical Formula 12, $R^1$, $R^3$, and $R^4$ are the same or different and are each independently selected from a halogen, a hydroxyl group, a substituted or unsubstituted C1 to C10 alkyl group, a substituted or unsubstituted C6 to C20 aryl group, or a substituted or unsubstituted C1 to C10 alkoxy group, n0 and n2 are the same or different, and are each independently an integer greater than or equal to 0, n1, n9, and n10 are the same or different, and are each independently an integer ranging from 0 to 4, and $Ar^1$, $Ar^2$, and $Ar^3$ are the same or different and are each independently represented by Chemical Formula 4:

Chemical Formula 4

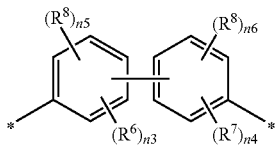

wherein, in Chemical Formula 4, $R^6$ and $R^7$ are the same or different and are each independently an electron withdrawing group, $R^8$ and $R^9$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different and are each independently a hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4.

Chemical Formula 14

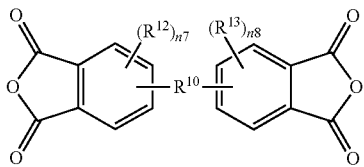

In Chemical Formula 14, $R^{10}$ is single bond, a substituted or unsubstituted C1 to C30 aliphatic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and are each independently a hydrogen or a C1 to C10 aliphatic organic group, and n7 and n8 are the same or different and are each independently an integer ranging from 0 to 3.

The poly(imide-amide) copolymer according to an embodiment may be prepared by using a known method of polymerizing a diamine, a diacyl derivative compound, and a dianhydride compound that are capable of preparing the structural unit represented by Chemical Formula 1, the structural unit represented by Chemical Formula 2, and the structural unit represented by Chemical Formula 3. However, by using a composition including the oligomer represented by Chemical Formula 12, and the compound represented by Chemical Formula 14 according to an embodiment, the poly(imide-amide) copolymer according to an embodiment may be prepared in a higher yield, as well as being capable of avoiding the bothersome precipitation process. The new method will be explained in detail as below.

In a conventional method of preparing a poly(imide-amide) copolymer, an amide structural unit may first be prepared by a reaction of a diacyl halide, such as, a dicarboxylic acid dichloride, and a diamine, and then an additional diamine and a dianhydride compound are added to the reactor to prepare an amic acid structural unit, as well as a poly(imide-amide) copolymer by linking the amide structural unit and the amic acid structural unit. Meanwhile, in the process of preparing the amide structural unit, there is a problem that a by-product, such as, a halogenated hydrogen (HX: 'H' indicates hydrogen, and 'X' indicates halogen), for example, hydrogen chloride (HCl), is produced. The by-product of the halogenated hydrogen causes corrosion of an element of an apparatus, and thus, should necessarily be removed by a precipitation process. In order to remove the by-product, an HX scavenger, such as a tertiary amine, may be added to the reactor, whereby a salt of HX is produced (please see Reaction Scheme 1 below). If the produced salt of HX is not removed and a film is produced therefrom, serious deterioration in optical properties of the produced film occurs. Therefore, a precipitation process to remove the salt of HX is required in the conventional method for preparing poly(imide-amide) copolymer. The precipitation process increases total process time and cost, while reduces yield of the final poly(imide-amide) copolymer produced therefrom.

Reaction Scheme 1

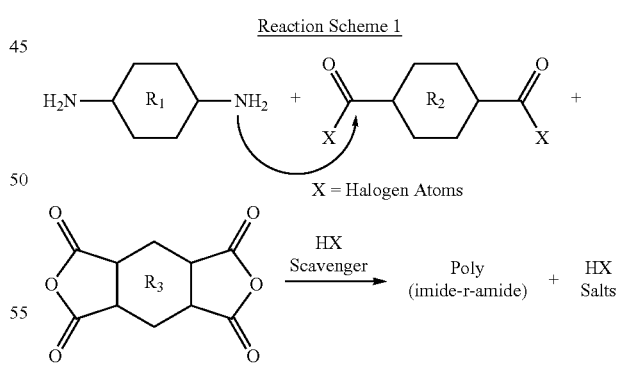

The inventors have found a new method for preparing a poly(imide-amide) copolymer, which includes first preparing an amide group-containing oligomer by reacting a diamine and a diacyl halide for preparing an amide structural unit, and then, reacting the amide group-containing oligomer, as a diamine monomer, with a dianhydride to prepare a poly(imide-amide) copolymer. The new method does not include a precipitation process, which is essential to the conventional method for preparing a poly(imide-amide)

copolymer. In the method for preparing a poly(imide-amide) copolymer according to an embodiment, it is possible to omit the precipitation process for removing the HX salt, and thus, not only the total process time and cost may be reduced, but also the yield of the final poly(imide-amide) copolymer may increase. Further, it is difficult to increase an amount of an amide structural unit in a poly(imide-amide) copolymer greater than a predetermined range due to a low solubility of the amide structural unit in a conventional method, and thus, an optical property of the poly(imide-amide) copolymer film prepared therefrom may be deteriorated. However, according to the new method, HX salt is not produced, whereby there is no problem of low solubility of a poly(imide-amide) copolymer during imidization process, even when an amount of the amide structural unit increases. Accordingly, it has been found that an article prepared from a poly(imide-amide) copolymer prepared by using the new method has further improved mechanical property, while maintaining good optical properties.

Therefore, according to an embodiment, provided is a composition for preparing a poly(imide-amide) copolymer that includes an oligomer represented by Chemical Formula 12, and a compound represented by Chemical Formula 14, which is a dianhydride compound that reacts with the oligomer, which renders avoiding the bothersome precipitation process for removing HCl, the by-product of a process for preparing an amide structural unit.

The oligomer represented by Chemical Formula 12 is an oligomer including an amide structural unit, having amino In Chemical Formulae 15 and 16,
$R^{12}$, $R^{13}$, n7 and n8 are the same as defined in Chemical Formula 14.

The electron withdrawing group may be selected from $-CF_3$, $-CCl_3$, $-CBr_3$, $-Cl_3$, $-NO_2$, $-CN$, $-C(=O)CH_3$, and $-CO_2C_2H_5$. In an exemplary embodiment, the electron withdrawing group may be $-CF_3$.

The composition for preparing a poly(imide-amide) copolymer according to an embodiment may include the oligomer represented by Chemical Formula 12 and the compound represented by Chemical Formula 14 in a mole ratio of 1:1.

Further, a content of the structural unit represented by 'n0' in the oligomer represented by Chemical Formula 12 is less than about 20 mole % based on the total mole number of the structural unit represented by 'n0', the structural unit represented by 'n2', and the compound represented by Chemical Formula 14.

A poly(imide-amide) copolymer prepared from a composition including the oligomer represented by Chemical Formula 12 and the compound represented by Chemical Formula 14 in a mole ratio of 1:1 may have a tensile modulus of greater than or equal to about 5.5 GPa, and a yellowness index of less than or equal to about 5.0, which may exhibit good mechanical property, as well as good optical property.

According to yet another embodiment, provided is a method for preparing a poly(imide-amide) copolymer including reacting an oligomer represented by Chemical Formula 12, and a compound represented by Chemical Formula 14:

Chemical Formula 12

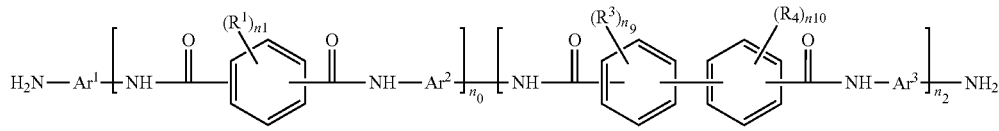

groups located on each of the two terminal ends thereof, whereby the oligomer may react with the dianhydride compound represented by Chemical Formula 14 to prepare a poly(imide-amide) copolymer according to an embodiment.

The compound represented by Chemical Formula 14 may include a compound represented by Chemical Formula 15, a compound represented by Chemical Formula 16, or a combination thereof:

wherein, in Chemical Formula 12,
$R^1$, $R^3$, $R^4$, n0, n1, n2, n9, n10, and $Ar^1$ to $Ar^3$ are the same as defined as above.

Chemical Formula 15

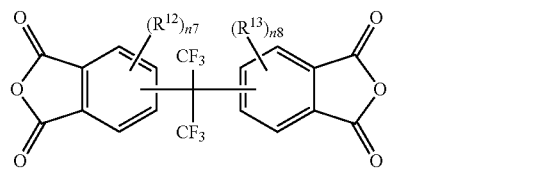

Chemical Formula 14

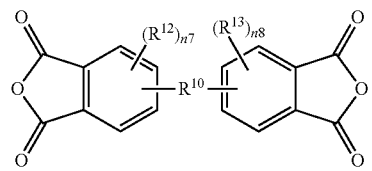

In Chemical Formula 14,
$R^{10}$, $R^{12}$, $R^{13}$, n7, and n8 are the same as defined as above.

The compound represented by Chemical Formula 14 may include a compound represented by Chemical Formula 15, a compound represented by Chemical Formula 16, or a combination thereof:

Chemical Formula 15

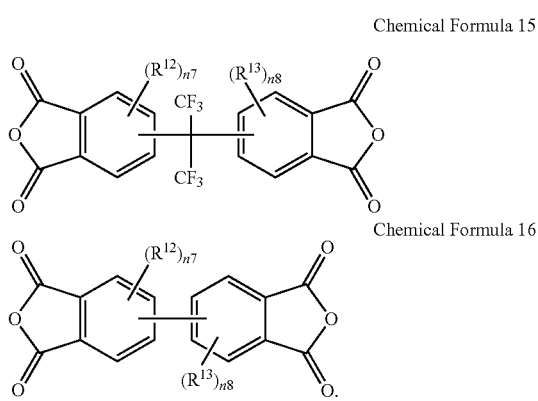

Chemical Formula 16

In Chemical Formulae 15 and 16, $R^{12}$, $R^{13}$, n7, and n8 are the same as defined above.

As described above, the oligomer represented by Chemical Formula 12 may be prepared by a conventional method of preparing a polyamide. Examples of a known method for preparing a polyamide include low temperature polymerization, interface polymerization, melt polymerization, solid polymerization, and the like, and are not limited thereto. Among the above methods, for example, the low temperature polymerization may include a reaction of a dicarboxylic acid dihalide and a diamine in a non-proton polar solvent to prepare an amide structural unit-containing oligomer represented by Chemical Formula 12.

For example, the oligomer represented by Chemical Formula 12 may be prepared by reacting a diamine represented by Chemical Formula 19 and a carboxylic acid dihalide represented by Chemical Formula 20 in a non-proton polar solvent, for example, a mixture of N,N-dimetylacetamide and pyridine:

  Chemical Formula 19 wherein, in Chemical Formula 19,

Ar is the same as defined for the above $Ar^1$, $Ar^2$, and $Ar^3$.

Chemical Formula 20

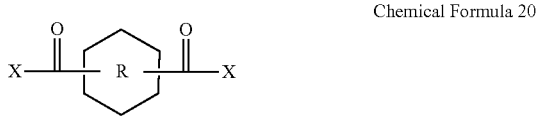

wherein, in Chemical Formula 20,

is a substituted or unsubstituted phenylene group or biphenylene group, where the "substituted" indicates a substitution with a substituent, such as, for example, with $R^1$, $R^3$, $R^4$, and the like, as defined above, and X indicates a halogen atom, for example, F, Cl, Br, I, and the like.

When the oligomer is prepared, the diamine represented by Chemical Formula 19 and the dicarboxylic acid dihalide represented by Chemical Formula 20 may react in a mole ratio of 1:1, and an excess of the diamine rather than the carboxylic acid dihalide may produce an oligomer, having amino groups located on each of the two terminal ends thereof, respectively. In this case, the unreacted diamine may be present in the final product, and may also react with the dianhydride in the following process as the prepared oligomer to prepare an imide structural unit. Accordingly, when both of n0 and n2 are 0 (zero) in Chemical Formula 12, it may be the unreacted diamine, which may also be an "oligomer" or an "amide structural unit-containing oligomer" in the present specification.

The prepared amide structural unit-containing oligomer may have a number average molecular weight of about 400 Daltons to 2,500 Daltons, which is not limited thereto.

The number average molecular weight of the oligomer may be controlled by adjusting the ratio of the diamine and the carboxylic acid dihalide to be used. By adjusting the number average molecular weight to the above range, solubility or viscosity of the reactants may easily be adjusted in the following reaction with the dianhydride.

The aprotic polar solvent may be, for example, a sulfoxide based solvent such as dimethylsulfoxide, diethylsulfoxide and the like, a formamide based solvent such as N,N-dimethyl formamide, N,N-diethylformamide, and the like, an acetamide based solvent N,N-dimethyl acetamide, N,N-diethylacetamide and the like, a pyrrolidone based solvent N-methyl-2-pyrrolidone, N-vinyl-2-pyrrolidone and the like, a phenol based solvent such as phenol, o-, m- or p-cresol, xylenol, halogenated phenol, catechol, and the like, or hexamethylphosphoramide, γ-butyrolactone, and the like. These may be used alone or as a mixture. However, the solvent is not limited thereto, and an aromatic hydrocarbon such as xylene and toluene may be used.

Further, in order to promote dissolution of a diamine and a dicarboxylic acid halide compound to be introduced to prepare the oligomer, as well as a polymer to be prepared, an alkaline metal salt or an alkaline earth metal salt in an amount of less than or equal to about 10% based on the weight of a solvent may be added to the solvent.

The oligomer represented by Chemical Formula 12, prepared from the method as described in the above Reaction Scheme 1, may react with the dianhydride represented by Chemical Formula 14 in accordance with a conventional method to prepare a polyimide. That is, the method may include reacting the oligomer including an amide structural unit represented by Chemical Formula 12 and the dianhydride represented by Chemical Formula 14 above in a certain mole ratio in an aprotic polar solvent as described above.

The reaction between the oligomer including an amide structural unit and dianhydride produces a poly(amic acid-amide), which is a precursor of a poly(imide-amide). The prepared poly(amic acid-amide) may be chemically and/or thermally imidized to partially or completely be imidized to produce a poly(imide-amide) copolymer according to an embodiment.

The chemical imidization may be performed by adding an imidizing agent, such as acetic anhydride and/or pyridine, to the poly(amic acid-amide) copolymer, and stirring the mixture. The thermal imidization may be performed by heating the prepared poly(amic acid-amide) copolymer at a predetermined temperature for a certain period of time.

Therefore, the method according to an embodiment may further include performing chemical and/or thermal imidization after reacting the amide structural unit-containing oligomer and the dianhydride.

According to yet another embodiment, provided is an article including a poly(imide-amide) copolymer according to an embodiment or the poly(imide-amide) copolymer prepared by the method according to an embodiment.

The article may be a film, a fiber, a coating material, or an adhesive.

The article may be formed of the poly(imide-amide) copolymer through a dry-wet method, a dry method, or a wet method, but is not limited thereto.

When the article is a film, it may be manufactured using a solution including the poly(imide-amide) copolymer through the dry-wet method, where a layer is formed by extruding the solution of the poly(amide-imide) copolymer from a mouth piece on a supporter, such as drum or an endless belt, drying the layer, and evaporating the solvent from the layer until the layer has a self-maintenance property. The drying may be performed, for example, at about 25° C. to about 300° C., for about 1 hour or less. When the surface of the drum and/or the endless belt used for the drying process becomes flat, a layer with a flat surface is formed. The layer obtained after the drying process is delaminated from the supporter, and subjected to a wet process, desalted, and/or desolventized. The manufacturing of the film is completed after the layer is elongated, dried, and/or heat treated.

The elongating may be performed at an elongation ratio in terms of surface ratio, which may range from about 0.8 to about 8, for example, about 1.3 to about 8. As used herein, the term "surface ratio" refers to a value obtained by dividing the area of a layer after the elongating, by an area of the layer before the elongating. A value of 1 or less denotes a relaxed state. On the other hand, the elongating may be performed not only in a surface direction but also at a thickness direction.

The heat treatment may be performed at a temperature of about 200° C. to about 500° C., for example at about 250° C. to about 400° C., for several seconds to about several minutes.

Also, the layer after elongating and heat treatment may be cooled slowly, for example, at a speed of about 50 degrees Centigrade per second (° C./second) or lower.

The layer may be formed as a single layer or as multiple layers.

The article may be a film, and the film may have a yellowness index (YI) of less than or equal to 5.0 at a thickness of about 50 micrometers (μm) according to an ASTM D1925 method.

The article may be a film, and the film may have a tensile modulus of greater than or equal to about 5.5 gigapascals (GPa), at a thickness of about 50 μm according to an ASTM D882 method.

That is, the article may maintain excellent optical properties of the polyimide or poly(imide-amide) copolymer, for example, a low yellowness index (YI), while having a an improved tensile modulus.

While not wishing to be bound by theory, it is understood that when a tensile modulus of an article is within the above range, the article may have a high hardness, and when the yellowness index is within the above range, the article may be transparent and colorless.

According to another embodiment, provided is a display device including the article.

As described above, the article may have a low yellowness index, while having a high tensile modulus, thus, can be used as a window film for a display device, for example, a flexible display device.

Hereafter, the technology of this disclosure is described in detail with reference to examples. The following examples and comparative examples are not restrictive but are illustrative only.

EXAMPLES

Synthesis Example 1: Preparation of an Oligomer 0.312 mole (100 grams) of 2,2'-bis(trifluoromethyl)benzidine (TFDB) and 0.625 mole (49.4 grams, g) of pyridine are dissolved in 1,700 g of N,N-dimethyl acetamide (DMAc) as a solvent in a round-bottomed flask, and 100 milliliters of DMAC is further added to the flask to dissolve the remaining TFDB. Then, 0.056 mole (11.4 g) of terephthaloyl chloride (TPCl) and 0.1 mole (27.88 g) of BPCI are divided into 4 portions, which are individually added, each portion at a time, to be mixed with the TFDB solution in DMAC at 25° C. The mixture is then vigorously stirred and reacted for 2 hours at room temperature.

The resultant solution is further stirred under a nitrogen atmosphere for 2 hours, and then added to 14.2 liters of water containing 710 g of NaCl. Then, the mixture is stirred for 10 minutes. Subsequently, a solid produced therein is filtered, re-suspended twice, and then re-filtered by using 10 liters (L) of deionized water. Then, the water remaining in the final product on the filter is removed as much as possible by thoroughly pressing the filtered precipitate on a filter. The precipitate is then dried at 80° C. under vacuum, to obtain an amide structural unit-containing oligomer represented by Chemical Formula 13, as a final product. The prepared amide structural unit-containing oligomer has a number average molecular weight of about 813 grams per mole (gram/mole).

Chemical Formula 13

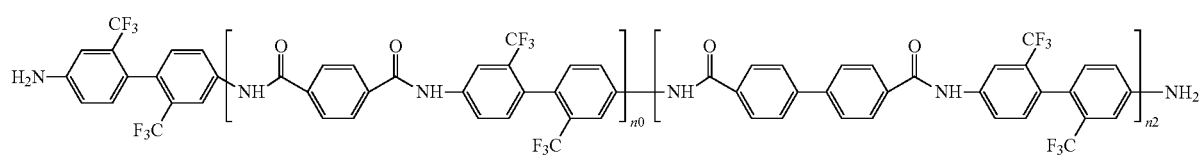

In Chemical Formula 13, n0 and n2 are each independently a number greater than or equal to 0.

Example 1: Synthesis of a poly(imide-amide) copolymer 12.6 grams (0.0155 mole) of the amide structural unit-containing oligomer prepared in Synthesis Example 1 is charged into a 4-neck double-walled 250 mL reactor, preheated to 30° C., and equipped with a mechanical stirrer and a nitrogen inlet, and 101.86 milliliters of dimethyl acetamide (DMAc) as a solvent is added thereto. The mixture is stirred at 30° C., under nitrogen atmosphere, until the oligomer completely dissolves. Then, 4.1309 grams (0.0093 mole) of 2,2-bis-(3,4-dicarboxyphenyl)hexafluoropropane dianhydride) (6FDA) and 1.8239 grams (0.0062 mole) of 3,3',4, 4'-biphenyltetracarboxylic dianhydride (BPDA) are slowly added to the solution where the oligomer is dissolved. After 10 milliliters of DMAc is further added to the solution, the solution is stirred for 48 hours to obtain a poly(amic acid-amide) copolymer, of which the solid content is 15%.

After cooling down the temperature of the poly(amic acid-amide) solution to 25° C., 4.75 grams of acetic acid anhydride is added to the solution, and the mixture is stirred for 30 minutes. Then, 3.68 grams of pyridine is added thereto, and the mixture is further stirred for 48 hours, at 25° C., to obtain a poly(imide-amide) copolymer solution.

Examples 2 and 3: Synthesis of Poly(Imide-Amide) Copolymers

The same method as Example 1 is used, except for using the oligomer prepared in Synthesis Example 1 in the same amount as in Example 1, and except for adding BPDA and 6FDA in a mole ratio as described in Table 1 below to further react to prepare poly(imide-amide) copolymer solutions according to Examples 2 and 3, respectively.

Comparative Examples 1 to 4: Synthesis of Poly Amic Acid

In the Comparative Examples 1 to 4, the oligomer prepared in Synthesis Example 1 is not used. Instead, TFDB, BPDA, and 6FDA, the monomers for preparing a poly amic acid, are reacted in a mole ratio as described in Table 1 below to prepare poly amic acid solutions. Particularly, NMP, as a solvent, is charged into a 250 liter reactor, which is purged with $N_2$ gas. Then, TFDB is added to the solvent at 25° C., and stirred at 100 revolutions per minute (rpm) for about 30 minutes, until the TFDB completely dissolves. Then, BPDA and 6FDA in a mole ratio as described in Table 1 below are added to the TFDB solution, and the solution is stirred for some time at room temperature to prepare a poly amic acid. This process takes about 1 to 2 days. Thus prepared poly amic acid is stored in a refrigerator.

Comparative Example 5: Synthesis of a Poly(Imide-Amide) Copolymer

The same method as in Comparative Examples 1 to 4 is used, except for not using BPCI, but instead of using TPCI, as a carboxylic acid halide monomer, in a mole ratio of 50% based on the mole number of TFDB, and instead of using BPDA and 6FDA in a mole ratio as described in Table 1 below to prepare a poly(imide-amide) copolymer according to Comparative Example 5, which includes structural units derived from TFDB, TPCI, BPDA, and 6FDA.

Preparation Example and Evaluation: Preparation and Evaluation of Polyimide or Poly(Imide-Amide) Copolymer Film Each of the poly(imide-amide) copolymer solutions prepared in Examples 1 to 3 and Comparative Example 5, and the poly amic acid solution prepared in Comparative Examples 1 to 4 are coated on a glass substrate and casted, and dried on a hot plate of 80° C. for 1 hour. Then, the glasses coated with the solution are placed into an oven and heated to 310° C. at a heating temperature of 3° C. per minute. The temperature is then slowly cooled down, and the films are separated from the glass substrates to obtain poly(imide-amide) copolymer films and polyimide films having a thickness of from about 50 micrometers to about 80 micrometers.

The obtained films are evaluated for tensile modulus and yellowness index, and the obtained values are described in Table 1 below.

The yellowness index is measured for a film having a thickness of about 50 micrometers, according to an ASTM D1925 method. The tensile modulus is measured by using an ASTM D882 method.

TABLE 1

| | Composition (mole %) | | | | | Tensile modulus (GPa) | YI (@50 μm) |
| --- | --- | --- | --- | --- | --- | --- | --- |
| | TFDB | TPCI | BPCI | 6FDA | BPDA | | |
| Comparative Example 1 | 100 | 0 | 0 | 10 | 90 | 8.2 | 12.6 |
| Comparative Example 2 | 100 | 0 | 0 | 15 | 85 | 7.9 | 11.3 |
| Comparative Example 3 | 100 | 0 | 0 | 80 | 20 | 4.7 | 2.1 |
| Comparative Example 4 | 100 | 0 | 0 | 90 | 10 | 4.4 | 1.8 |
| Comparative Example 5 | 100 | 50 | 0 | 27 | 23 | 5.4 | 2.9 |
| Example 1 | 100 | 18 | 32 | 27.5 | 22.5 | 6.2 | 2.9 |
| Example 2 | 100 | 18 | 32 | 30 | 20 | 5.9 | 2.8 |
| Example 3 | 100 | 18 | 32 | 22.5 | 27.5 | 6.6 | 4.0 |

As shown in Table 1, the films prepared from the poly(imide-amide) copolymers including an amide structural unit derived from TFDB, TPCI, and BPCI, and an imide structural unit derived from TFDB, 6FDA, and BPDA, wherein the content of TPCI is less than 20 mole percent (mole %) based on the content of TFDB, according to Examples 1 to 3 have low yellowness index, such as, less than or equal to about 5, and high tensile modulus of greater than or equal to 5.5 gigapascals (GPa), and meet high mechanical strength and good optical property. These films are usable for preparing a high hardness window film of a flexible display device, which requires high mechanical strength and good optical property.

Meanwhile, the film according to Comparative Example 5, which is prepared from the oligomer prepared in Synthesis Example 2, which does not include BPCI, as a monomer for preparing an amide structural unit, has good optical property due to low YI of less than 3, but has not sufficient mechanical strength.

Further, the films prepared from the polyimide according to Comparative Examples 1 to 4 merely show trade-off relationship between the mechanical strength and YI, depending on the ratio of BPDA and 6FDA, which are the monomers for preparing an imide structural unit. None of the films according to Comparative Examples 1 to 4 show both good optical property and high mechanical strength.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A film comprising a poly(imide-amide) copolymer, the poly(imide-amide) copolymer consisting of:
   a structural unit represented by Chemical Formula 1;
   a structural unit represented by Chemical Formula 2; and
   any one of a structural unit represented by Chemical Formula 3, a structural unit of an amic acid precursor of the structural unit represented by Chemical Formula 3, and a combination thereof;
   wherein the film has a tensile modulus of greater than or equal to about 5.5 gigapascals according to an ASTM D882 method, and a yellowness index of less than or equal to about 5 according to an ASTM D 1925 method, when the film has a thickness of about 50 micrometers:

Chemical Formula 1

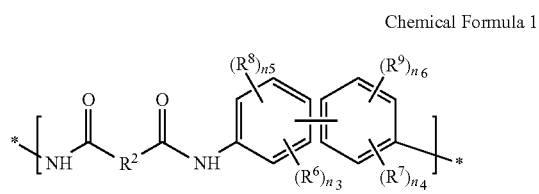

wherein, in Chemical Formula 1, $R^2$ is a substituted or unsubstituted phenylene group, $R^6$ and $R^7$ are the same or different and are each independently an electron withdrawing group;

$R^8$ and $R^9$ are the same or different, and are each independently a halogen, a hydroxy group, a substituted or unsubstituted C1 to C10 aliphatic organic group, a C6 to C20 aromatic organic group, an alkoxy group of formula $-OR^{204}$, wherein $R^{204}$ is a C1 to C10 aliphatic organic group, or a silyl group of formula $-SiR^{205}R^{206}R^{207}$ wherein $R^{205}$, $R^{206}$, and $R^{207}$ are the same or different, and are each independently hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4;

Chemical Formula 2

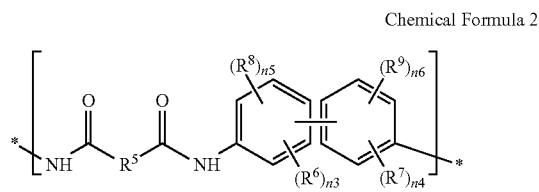

wherein, in Chemical Formula 2, $R^5$ is a substituted or unsubstituted biphenylene group, $R^6$ to $R^9$, n3 and n4 are the same as defined in Chemical Formula 1;

Chemical Formula 3

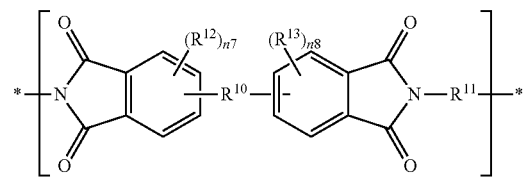

wherein, in Chemical Formula 3, $R^{10}$ is single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula $-OR^{208}$, wherein $R^{208}$ is a C1 to C10 aliphatic organic group, or a silyl group of formula $-SiR^{209}R^{210}R^{211}$, wherein $R^{209}$, $R^{210}$, and $R^{211}$ are the same or different, and are each independently hydrogen or a C1 to C10 aliphatic organic group, n7 and n8 are each independently an integer ranging from 0 to 3, and $R^{11}$ is represented by Chemical Formula 4:

Chemical Formula 4

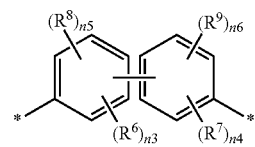

wherein, in Chemical Formula 4, $R^6$ to $R^9$, n3 and n4 are the same as defined in Chemical Formula, and wherein a mole ratio of the sum of the structural unit represented by Chemical Formula 1 and the structural unit represented by Chemical Formula 2, and the structural unit represented by Chemical Formula 3 is about 20:80 to about 80:20.

2. The film according to claim 1, wherein the structural unit represented by Chemical Formula 3 is represented by at least one of a structural unit represented by Chemical Formula 5 and a structural unit represented by Chemical Formula 6:

Chemical Formula 5

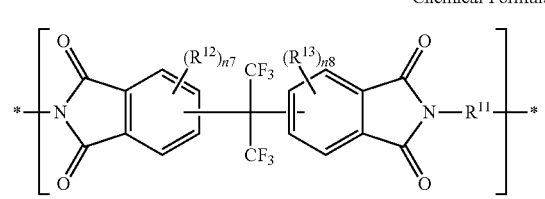

Chemical Formula 6

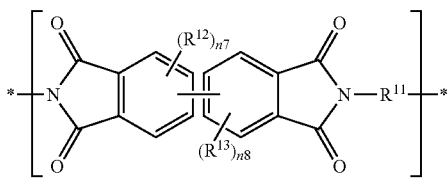

wherein, in Chemical Formulae 5 and 6,
$R^{11}$ to $R^{13}$, n7, and n8 are the same as defined in Chemical Formula 3.

3. The film according to claim 2, wherein the structural unit represented by Chemical Formula 5 and the structural unit represented by Chemical Formula 6 are present in the poly(imide-amide) copolymer in a mole ratio of about 1:99 to about 99:1.

4. The film according to claim 1, wherein the electron withdrawing group is selected from —$CF_3$, —$CCl_3$, —$CBr_3$, —$Cl_3$, —$NO_2$, —CN, —C(=O)$CH_3$, and —$CO_2C_2H_5$.

5. The film according to claim 1, wherein the structural unit represented by Chemical Formula 1 is represented by at least one of a structural unit represented by Chemical Formula 7 and a structural unit represented by Chemical Formula 8:

Chemical Formula 7

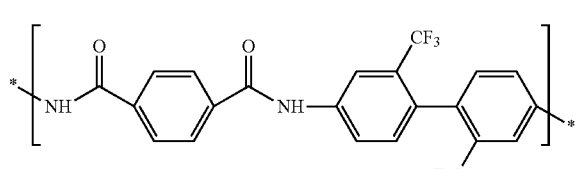

Chemical Formula 8

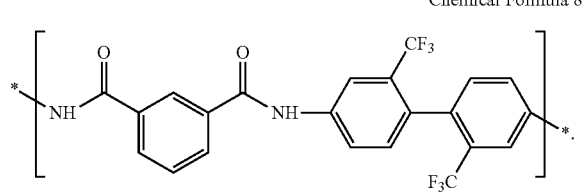

6. The film according to claim 1, wherein the structural unit represented by Chemical Formula 2 is represented by a structural unit represented by Chemical Formula 9:

Chemical Formula 9

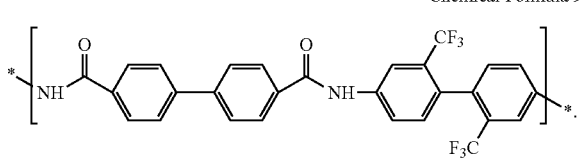

7. The film according to claim 1, wherein the structural unit represented by Chemical Formula 3 is represented by at least one of a structural unit represented by Chemical Formula 10 and a structural unit represented by Chemical Formula 11:

Chemical Formula 10

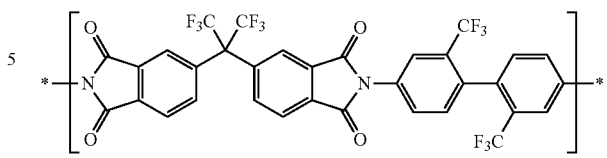

Chemical Formula 11

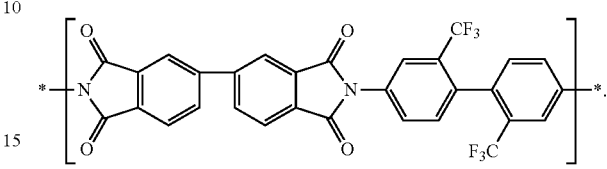

8. The film according to claim 1, wherein the structural unit represented by Chemical Formula 1 is represented by Chemical Formula 7, the structural unit represented by Chemical Formula 2 is represented by the structural unit represented by Chemical Formula 9, and the structural unit represented by Chemical Formula 3 is represented by a combination of the structural unit represented by Chemical Formula 10 and the structural unit represented by Chemical Formula 11.

Chemical Formula 7

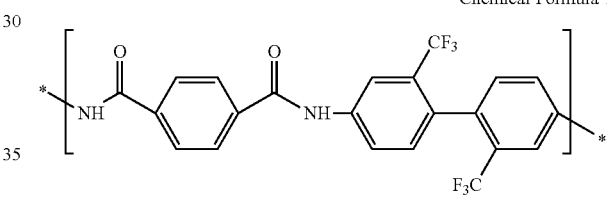

Chemical Formula 9

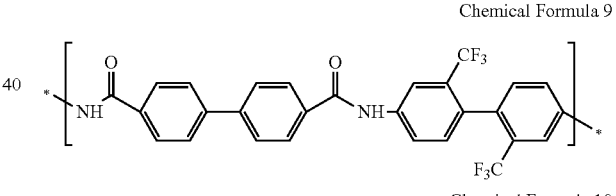

Chemical Formula 10

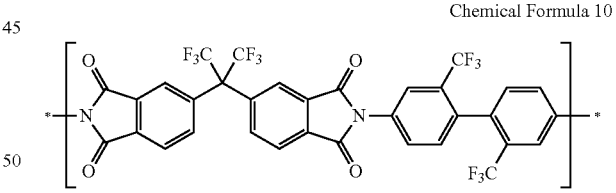

Chemical Formula 11

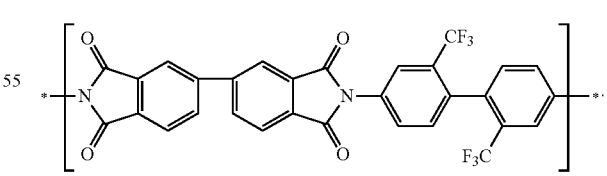

9. A display device comprising the film according to claim 1.

10. The display device according to claim 9, wherein the display device is a flexible display device.

* * * * *